US008586807B2

(12) United States Patent
Hatcher

(10) Patent No.: US 8,586,807 B2
(45) Date of Patent: *Nov. 19, 2013

(54) PROCESS FOR THE SELECTIVE PRODUCTION OF HYDROCARBON BASED FUELS FROM PLANTS CONTAINING ALIPHATIC BIOPOLYMERS UTILIZING WATER AT SUBCRITICAL CONDITIONS

(75) Inventor: Patrick G. Hatcher, Suffolk, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/470,649

(22) Filed: May 14, 2012

(65) Prior Publication Data

US 2012/0302806 A1  Nov. 29, 2012

Related U.S. Application Data

(63) Continuation-in-part of application No. 13/096,016, filed on Apr. 28, 2011.

(60) Provisional application No. 61/485,681, filed on May 13, 2011, provisional application No. 61/358,207, filed on Jun. 24, 2010, provisional application No. 61/470,853, filed on Apr. 1, 2011.

(51) Int. Cl.
  *C07C 1/20* (2006.01)
  *C07C 4/22* (2006.01)
(52) U.S. Cl.
  USPC .......................................... 585/240; 585/242
(58) Field of Classification Search
  None
  See application file for complete search history.

(56) References Cited

U.S. PATENT DOCUMENTS

| 2006/0099693 | A1 | 5/2006 | Kobzeff et al. |
| 2007/0006523 | A1 | 1/2007 | Myllyoja et al. |
| 2008/0262190 | A1* | 10/2008 | Koskimies et al. ........... 528/271 |
| 2009/0077863 | A1 | 3/2009 | Oyler |
| 2009/0283442 | A1 | 11/2009 | McCall et al. |
| 2011/0126448 | A1* | 6/2011 | Dumenil ........................ 44/307 |
| 2012/0238732 | A1* | 9/2012 | Wang ............................ 530/418 |

OTHER PUBLICATIONS

Pergamon, Organic Geochemistry 30 (1999) 1495-1507, Similarities and differences in hydrous pyrolysis of biomass and source rocks, Tanja Barth, Department of Chemistry, University of Bergen, Bergen, Norway.
Energy & Fuels 2004, 18, 590-598, Overview of Applications of Biomass Fast Pyrolysis Oil, S. Czernik and A. V. Bridgwater, National Bioenergy Center NREL, Golden, Colorado, and Bio-Energy Research Group, Aston University, Birmingham, UK, Received Oct. 1, 2003. Revised Manuscript Received Jan. 19, 2004.
Energy & Fuels 2007, 21, 1792-1815, Historical Developments in Hydroprocessing Bio-oils, Douglas C. Elliott, Pacific Northwest National Laboratory, Richland, Washington, Received Jan. 25, 2007, Revised Manuscript Received Mar. 16, 2007.

(Continued)

*Primary Examiner* — Tam M Nguyen
(74) *Attorney, Agent, or Firm* — Young Basile

(57) ABSTRACT

Disclosed herein is the use of terrestrial plant materials (e.g., leaves and bark) that contain biopolymer materials to produce hydrocarbon-rich crude oils that can be refined further into hydrocarbon-based biofuels, via the hydrous pyrolysis method, which involves heating to subcritical temperatures and pressures in an aqueous medium. One can also isolate the aliphatic biopolymers and utilize them as feedstocks for production of the hydrocarbon-rich crude via hydrous pyrolysis.

12 Claims, 9 Drawing Sheets

(56) References Cited

OTHER PUBLICATIONS

Pergamon, Geochimica et Cosmochimica Acta, vol. 61, No. 17, pp. 3691-3723, 1997, Elsevier Science Ltd., Experiments on the role of water in petroleum formation, M.D. Lewan, US Geological Survey, Denver, Colorado, Received Apr. 23, 1996, accepted in revised form Apr. 25, 1977.

Effects of Diagenesis and Catagenesis on Ladderane Lipids as Determined by Hydrous Pyrolysis, Andrea Jaeschke, Michael D. Lewan, Stefan Schouten and Jaap S. Sinninghe Damste, 1) Royal Netherlands Institute for Sea Research, Dep. Marine Biogeochemistry & Toxicology, Texel, The Netherlands, 2) US Geological Survey, Denver, Colorado (2 pages), 2005.

Effects of diagenesis and catagenesis on ladderane lipids as determined by hydrous pyrolysis, Andrea Jaeschke, Michael D. Lewan, Stefan Schouten, Jaap S. Sinninghe Damste, 1) NIOZ Royal Netherlands Institute for Sea Research, Dep. Marine Biogeochemistry & Toxicology, The Netherlands, 2) US Geological Survey, Denver, Colorado (Poster), 2005.

Organic Geochemistry 39 (2008) 1735-1741, Thermal stability of ladderane lipids as determined by hydrous pyrolysis, Andrea Jaeschke, Michael D. Lewan, Ellen C. Hopmans, Stefan Schouten, Jaap S. Sinninghe Damste, a) NIOZ Royal Netherlands Institute for Sea Research, Department of Marine Organic Biogeochemistry, Texel, The Netherlands, b) US Geological Survey, Denver, Colorado.

Energy & Fuels 2006, 20, 848-889, Pyrolysis of Wood/Biomass for Bio-oil: A Critical Review, Dinesh Mohan, Charles U. Pittman, Jr., and Philip H. Steele, Dept. of Chemistry, Mississippi State University, Mississippi State, Mississippi, Environmental Chemistry Division, Industrial Toxicology Research Centre, Lucknow, India, and Forest Products Dept., Mississippi State University, Mississippi State, Mississippi, Received Jul. 28, 2005, Revised Manuscript Received Dec. 15, 2005.

Chapter 13, Chitin: 'Forgotten' Source of Nitrogen, From Modern Chitin to Thermally Mature Kerogen: Lessons from Nitrogen Isotope Ratios, A. Schimmelmann, R. P. Wintsch, M. D. Lewan, and M. J. DeNiro, 1) Dept. of Geological Sciences, Indiana University, Bloomington, in, 2) US Geological Survey, Lakewood, Co, 3) Dept. of Geological Sciences, University of California, Santa Barbara, CA, 1998 American Chemical Society, pp. 226-242.

Energy & Fuels 1999, 13, 914-921, Fuel Oil Quality of Biomass Pyrolysis Oils—State of the Art for the End Users, Anja Oasmaa and Stefan Czernik, VTT Energy, Espoo, Finland, and NREL, Golden, Colorado, Received Dec. 22, 1998, Revised Manuscript Received Mar. 18, 1999, 1999 American Chemical Society.

Organic Geochemistry 40 (2009) 400-415, Thermal decomposition processes in algaenan of *Botryococcus braunii* race L. Part 1: Experimental data and structural evolution, Elodie Salmon, Francoise Behar, Francois Lorant, Patrick G. Hatcher, Pierre Metzger, Paul-Marie Marquaire, 2008 Elsevier Ltd.

Organic Geochemistry 40 (2009) 416-427, Thermal decomposition process in algaenan of *Botryococcus braunii* race L. Part 2: Molecular dynamics simulations using the ReaxFF reactive force field, Elodie Salmon, Adri C.T. van Duin, Francois Lorant, Paul-Marie Marquaire, William A. Goddard, III, 2008 Elsevier Ltd.

Notification of Transmittal, International Search Report and Written Opinion of the International Searching Authority dated Feb. 9, 2012, from the corresponding International Application No. PCT/US2011/041039 filed Jun. 20, 2011.

* cited by examiner a) Suberin/suberan b) Agave cutan c) Tomato cutin d) Algaenan River Birch, whole River Birch, Suberan

PROCESS FOR THE SELECTIVE PRODUCTION OF HYDROCARBON BASED FUELS FROM PLANTS CONTAINING ALIPHATIC BIOPOLYMERS UTILIZING WATER AT SUBCRITICAL CONDITIONS

CROSS REFERENCE TO RELATED APPLICATIONS

This application claims priority to U.S. Provisional Application Ser. No. 61/485,681 filed on May 13, 2011, incorporated herein in its entirety. This application is a continuation-in-part of U.S. application Ser. No. 13/096,016 filed on Apr. 28, 2011, which claims priority to U.S. Provisional Application Ser. No. 61/358,207 filed on Jun. 24, 2010 and to U.S. Provisional Application Ser. No. 61/470,853 filed on Apr. 1, 2011, all incorporated herein in their entirety.

FIELD OF THE INVENTION

The present invention relates in general to the production of hydrocarbon-based fuel from plants containing aliphatic biopolymers.

BACKGROUND

Interest in alternative and renewable biological sources of liquid fuels has soared in recent years because of associated advantages that include, but are not limited to, (1) removing $CO_2$ from the atmosphere, (2) mitigating the dependence on fossil fuels that derive mostly from countries that are not particularly friendly, and (3) finding a longer term solution for sources of the fuels. Most biomass sources are mainly composed of lipids, carbohydrates, and proteins. The current processes for producing biodiesel fuels involve the conversion of lipids (trigycerides) within plant biomass to fatty acid methyl esters (FAMESs) by trans-esterification. Production of alcohol-based fuels generally involves the conversion of carbohydrates in plants to alcohol by fermentative means. Biobutanol, a substitute for gasoline, can be synthesized directly by micro-organisms or can be chemically synthesized from carbohydrates. One strategy for fuel production from biomass is high-temperature gasification of the biomass followed by reforming to hydrocarbon fuels (the Fischer-Tropsch process).

Pyrolysis is proving to be a promising technology for the production of bio-oils from woody biomass and grasses, but these have been shown to require upgrading to be suitable for refinery operations. One of the inherent challenges to making pyrolysis useful for plant biomass is the need to cost-effectively convert the bio-oils that derive from carbohydrate and lignin components of plants to hydrocarbons. While carbohydrates and lignin are the major biopolymeric components of most land plants and many aquatic plants, the only plant constituents that have the potential to produce hydrocarbons directly are the fats, mainly triglycerides of fatty acids. A current strategy for hydrocarbon production from fats is to first convert them to FAMES and then to upgrade them catalytically to hydrocarbons.

SUMMARY

Disclosed herein is the use of terrestrial plant materials (e.g., leaves and bark) that contain biopolymer materials to produce hydrocarbon-rich crude oils that can be refined further into hydrocarbon-based biofuels, via the hydrous pyrolysis method, which involves heating to subcritical temperatures and pressures in an aqueous medium. One can also isolate the aliphatic biopolymers and utilize them as feedstocks for production of the hydrocarbon-rich crude via hydrous pyrolysis.

One process disclosed herein for producing selective hydrocarbons from plants comprises providing a feed material of plant biomass containing aliphatic polymers, subjecting the plant biomass to water at a subcritical temperature for a predetermined period of time in a reactor, collecting an aqueous liquid phase product from the reactor and separating the hydrocarbons from the aqueous liquid phase product. The process can further comprise genetically modifying plant biomass prior to providing the plant biomass as the feed material.

The hydrocarbon chain lengths of the separated hydrocarbons are between a range of $C_1$ and $C_{30}$ and the hydrocarbon chain lengths vary between the range as a function of a type of plant biomass provided. The aliphatic biopolymer is one or more of suberin, suberan, cutin and cutan.

Another process disclosed herein for producing selective hydrocarbons from plants comprises extracting aliphatic biopolymer from plant material, subjecting the aliphatic biopolymer to water at a subcritical temperature for a predetermined period of time in a reactor, collecting a liquid product containing hydrocarbons from the reactor and separating the hydrocarbons from the liquid product.

Yet another process for producing selective hydrocarbons from plants comprises providing a feed material of plant biomass containing aliphatic polymers and subjecting the plant biomass to hydrous pyrolysis. The aliphatic biopolymers are cracked to form hydrocarbons and a remainder of the plant biomass will depolymerize in an aqueous phase. A liquid mixture resulting from the hydrous pyrolysis is collected and the hydrocarbon is separated from the liquid mixture. The hydrous pyrolysis comprises subjecting the plant biomass containing aliphatic biopolymer to water at a subcritical temperature for a predetermined period of time in a reactor. A remainder of the liquid mixture after the hydrocarbon is separated comprises carbohydrates, lignin, and proteins.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
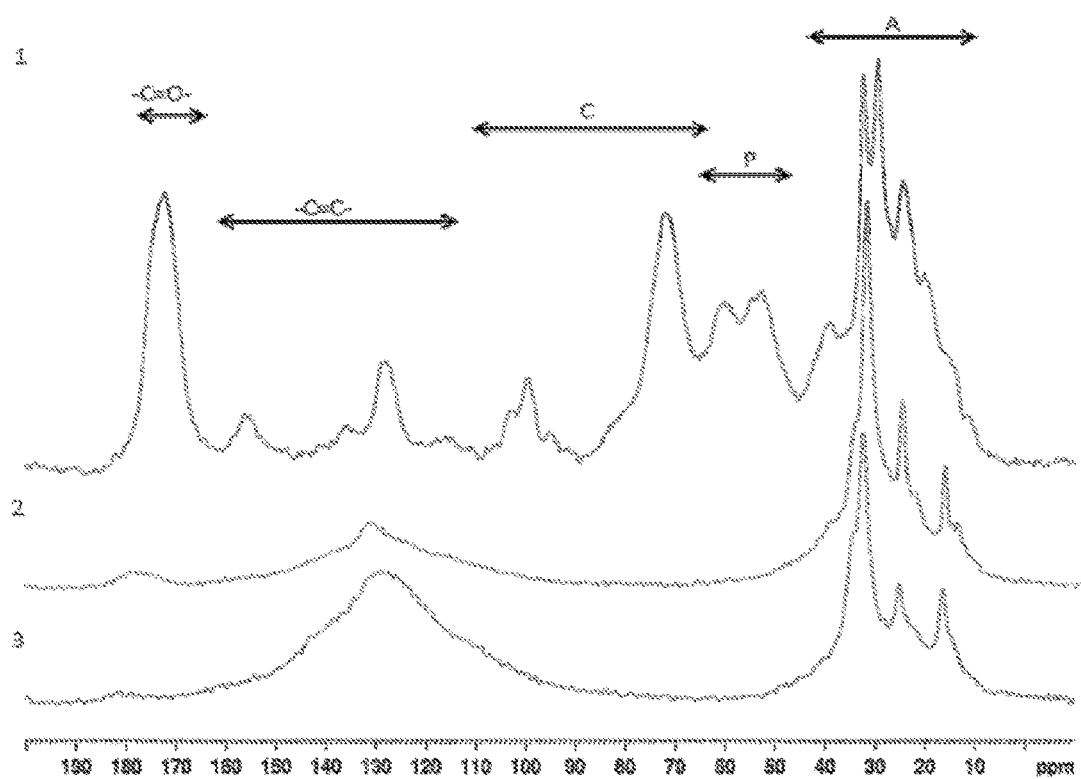
FIG. 1 is $^{13}C$ cross polarization magic angle spinning nuclear magnetic resonance (CPMAS NMR) spectra of freeze dried *Scenedesmus* sp. (1–), of the biomass treated by acid hydrolysis (2–) or with sodium hydroxide (3–). Regions L correspond to lipidic structures from the algaenan, C to carbohydrate and P to proteins.

Processes and feed materials are disclosed that have a cracking mechanism that yields bio-crude, which has similar properties to paraffinic petroleum but will not have the deleterious aspects of fossil fuels such as sulfur and aromatic components, which contribute disproportionately to environmental pollution. The process employs reproducing the natural process of thermal cracking and expulsion that takes place, for example, in buried shales to produce petroleum. The production of a hydrocarbon-based crude oil from plants will enable a domestic, commercial, alternative, carbon-neutral, feedstock for existing refineries. The disclosed processes provide a high-value bio-crude product from plants without the removal of water that supplements the conventional methyl ester biofuel product being exploited commercially and automatically enhances the yield of biofuels from this biomass source. The feed materials disclosed herein provide a feedstock that can be readily and directly converted to a refinable hydrocarbon fuel.

Some plants, mainly algae such as *Botryococcus braunii*, *Scenedesmus* sp., various Dinoflagellates, and various Eustigmatophytes, contain another type of biopolymer that can be converted directly to hydrocarbon fuels. This biopolymer is called algaenan. This protective algaenan biopolymer is a recalcitrant material that persists in sediments and is thought to be converted into petroleum over geological time. Algaenan subjected to hydrous pyrolysis produces saturated hydrocarbons in the form of a bio-oil that can easily be refined to transportation fuels, as disclosed in U.S. application Ser. No. 13/096,016, incorporated herein in its entirety. Based on the hydrous pyrolysis of both whole algae and its isolated algaenan, it is concluded that the algaenan biopolymer in the algae is responsible for the hydrocarbon-rich bio-oil produced.

Higher plants, e.g., terrestrial plants, also have been known to contain aliphatic biopolymers that yield hydrocarbons upon flash pyrolysis. For example, the leaves of many deciduous and non-deciduous plants contain an aliphatic polyester biopolymer called cutin. Some leaves also contain a biopolymer called cutan that shares an analogy with algaenan in the manner in which it is obtained. Some plants contain another aliphatic biopolymer called suberin in their bark. Again, an analogous polymer to algaenan in such bark is suberan. All of these polymers share some common chemistry in that they are highly aliphatic and appear to be made up of fatty acid-like substructures linked by ester bonds. Moreover, they all have been shown to yield either fatty acids or hydrocarbons upon flash pyrolysis.

Chemical procedures for the isolation and the characterization, at a molecular level, of the biopolymers from higher plants typically consist of treatment with a succession of organic solvents, acids, and bases, all of which lead to the removal of free lipids, carbohydrates and proteins. However, the embodiments disclosed herein economically produce a product enriched in the respective biopolymers. Once isolated, these can be subjected to hydrous pyrolysis. Alternatively, the whole plant parts (leaves and bark) containing this biopolymer can be subjected to hydrous pyrolysis. The conversion of these biopolymers, either in their purified form or in the biomass itself, by hydrous pyrolysis can be used to produce the hydrocarbon-based crude oil. The presence of water during the pyrolysis is useful for the production of saturated hydrocarbons, and it provides a pathway for removing low molecular weight acidic compounds from the crude oil because they dissolve into the aqueous phase at the subcritical temperatures and pressures used in the process.

The existence of aliphatic bio-polymers somewhat similar to algaenan in non-algae plant biomass will also yield hydrocarbon-based oils upon hydrous pyrolysis at subcritical temperatures and pressures. Thus, when one subjects these biomass products to hydrous pyrolysis, the aliphatic biopolymers will undergo cracking to form these oils and the rest of the biomass (carbohydrates, lignin, and proteins) will become depolymerized and soluble in the aqueous phase. Thus, the rest of the biomass does not contribute significantly to the bio-oils. Moreover, by tuning of the temperature/pressure conditions along with appropriate biomass selection, one can insure that only products of the thermal cracking of the aliphatic biopolymers are present in the bio-oils.

The production of a hydrocarbon-based crude oil from higher plant biomass will enable a domestic, commercial, alternative, carbon-neutral, feedstock for existing refineries. Benefits include providing a high-value fuel precursor product from plant biomass that supplements the conventional methyl ester biofuel product being exploited commercially and automatically enhancing the yield of biofuels from biomass sources. Another benefit is providing a feedstock that can be readily and directly converted by hydrous pyrolysis processes to a refinable hydrocarbon fuel.

As water is heated in the subcritical temperature range (i.e., below 374° C.), its properties change; hydrogen bonding decreases between water molecules as the temperature increases which in turn causes its dissociation constant to increase (i.e. increase in hydroxide and hydronium ion concentration). This increase in the hydroxide and hydronium ion concentration enable water to become a hydrolyzing reagent capable of hydrolyzing/depolymerizing biopolymers typical of plant biomass, the lipids, carbohydrates, lignin, and proteins; thus effectively isolating the aliphatic biopolymers as insoluble phases. Since these aliphatic biopolymers, like algaenan in many species of algae, are non-hydrolyzable, results show that they undergo pyrolytic cracking and produce the hydrocarbon-based bio-oil. This process occurs whether the aliphatic biopolymers are a pure isolate or exist in whole plant biomass, mixed with the other biopolymers such as carbohydrates, proteins, and lipids.

In experiments with algae, both isolated algaenan and whole algae were subjected to hydrous pyrolysis at three different temperatures in high-pressure autoclaves. This was done to determine the kinetics of the process but also to evaluate what would be optimum conditions for the experiment. After 72 hours of treatment, the samples were cooled to room temperature. Four different products were collected: 1) gas, 2) hydrocarbon oil floating on the surface of the water, 3) the water, and 4) the remaining solid residue. Each of these isolates was analyzed for their chemical composition. Described below is the information that is salient to the embodiments herein.

$^{13}$C NMR spectra were collected for whole algae before and after subcritical temperature treatment, depicted in FIG. 1. At 260° C. for 72 hours a complete disappearance of peaks corresponding to proteins and carbohydrates (peaks at 50, 65, 72, 105, and 175 ppm) is observed. These results indicate that carbohydrates and proteins are rendered soluble as they are removed from the solid phase. The main peak remaining in the residue is that of aliphatic biopolymer algaenan (33, 25, 15 ppm) and a broad peak for aromatic carbons (100-160 ppm). At this temperature, the oil produced is small (8.5% of dry starting mass). At 360° C. for 72 hours we notice that the percentage of oil increases significantly to 16.7%. The residue at this temperature shows an increasing amount of aromatic (100-160 ppm) character and the aliphatic algaenan signals diminish in comparison. These results all indicate the following:

1. that carbohydrate and protein separation from algaenan occurs at low temperature, such as lower than 260° C.;
2. that cracking of the algaenan occurs and is greatest at 360° C.; and
3. that a significant amount of oil is produced at the higher temperature.

Figure 2:
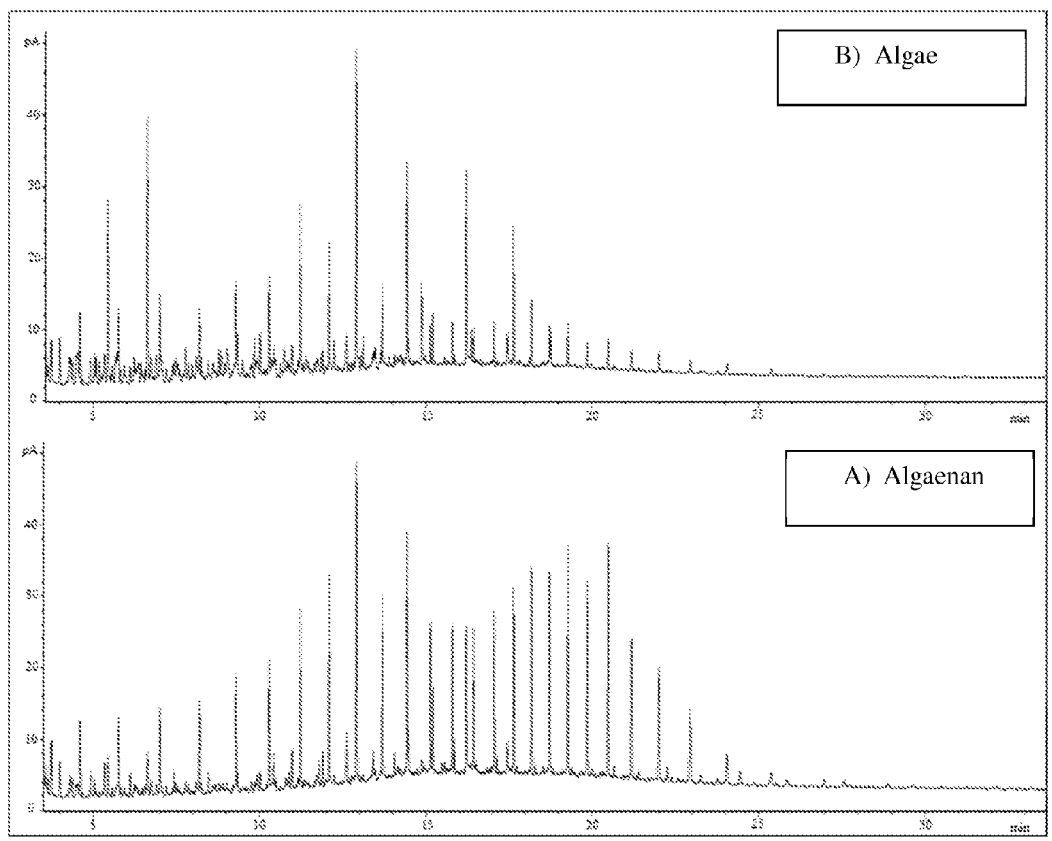
FIG. 2 is a gas chromatogram of the oil floating on the surface of water for (A) Algae and (B) Algaenan after exposure to 360° C. for 72 hours.

Analysis of the oil produced at 360° C. for 72 hours from algae by gas chromatography and gas chromatography/mass spectrometry as depicted in FIG. 2 shows that the major components are saturated normal hydrocarbons, similar to those observed in some crude oils. The oil obtained from hydrous pyrolysis of the algaenan is similar in composition and is also depicted in FIG. 2. The yield at this temperature is 14.5% of the algaenan dry weight. This indicates that the oil produced during hydrous pyrolysis of the whole algae is primarily sourced from the algaenan. The presence of some additional peaks in the oil from whole algae, compared with that from algaenan, is most likely attributable to either lipid triglycerides or presently unknown components of the whole algae. Some of these peaks are alkylated aromatic hydrocarbons, most likely derived from hydrous pyrolysis of proteins.

The hydrous pyrolysis of whole algae, and also its algaenan, yields a significant proportion of hydrocarbons. These can be readily refined into fuel for gasoline engines, jet engines, or diesel engines, for example. Table 1 shows the results of a simulated distillation analysis of the hydrocarbons constituting the algae crude. From these results we can determine that this algae crude has a better distillation characteristic that many well-known commercial crude oils.

suberin and suberan and are all long-chain polymethylenic (aliphatic) polyesters. The cuticular biopolymers, cutin and sometimes cutan, are contained within the cuticular layers of leaves and fruit while roots and bark contain the suberinic biopolymers, suberin and sometimes suberan. Cutin and suberin are defined as saponifiable, while cutan and suberan are defined as non-saponifiable. Depolymerization studies have shown cutin to be comprised of mainly $C_{16}$ and $C_{18}$ monomeric alkyl units containing primary (1°) alcohol, secondary (2°) alcohol and acid functional groups with the 2° alcohol groups located on $C_9$ or $C_{10}$. High resolution magic angle spinning (HRMAS) nuclear magnetic resonance (NMR) investigation of cutin has supported these findings, also showing evidence for ester cross-linking and structures have been proposed. Cutan depolymerization has yielded long-chain $C_7$-$C_{33}$ polymethylenic domains with alcohol and acid functional groups. Cutan has been found to be a crystalline polymethylenic cross-linked biopolyester with alcohol, aromatic, epoxide and acid functional groups, and a structure has been proposed.

Suberin is a biopolymer that is localized in cell walls of the endodermis of primary roots and the periderm of mature roots and bark. Investigators have proposed that the structure for this hydrolyzable polyester is composed of long-chain ($C_{11}$-$C_{24}$) polymethylenic domains with carboxylic acids held together by aromatic rings and esters. Depolymerization studies of suberin have found the polymethylenic monomers to be mainly comprised of $C_{16}$, $C_{18}$, $C_{22}$ and $C_{24}$ ω-hydroxy fatty acids and dicarboxylic acids. Suberinic material is comprised of heteropolymeric material that occurs within two structural domains, one a polymethylenic domain and the other a separate associated polyphenolic domain. The polyphenolic domain has been found in trace amounts compared to the polymethylenic domain and comprises a small fraction (<5%) of the suberinic material. It has been concluded from NMR spin diffusion experiments that suberin polymethylenic chains are associated and/or bound to the cell wall matrix. It is proposed that suberin polymethylenes interface with cell wall polysaccharides via suberin polyphenolics based on spin diffusion occurring more rapidly from cell wall polysaccharides to aromatic than to polymethylenic groups. The recent discovery of glycerol groups in depolymerization

TABLE 1

Simulated distillation results for a series of commercial oils and the algae crude.

| Crude oil | Yield at temperature (° C.) | | | | | % < 720° C. (<1328° F.) | % > 720° C. (>1328° F.) |
|---|---|---|---|---|---|---|---|
| | 10% | 20% | 50% | 70% | 90% | | |
| ODU Algae Crude | 108 | 138 | 247 | 310 | 390 | 100 | 0 |
| Arabian Light | 126 | 177 | 341 | 459 | 627 | 94 | 6 |
| RAS Burden Medium | 141 | 229 | 431 | 559 | 696 | 88 | 12 |
| Sahara Blend Extra Light | 95 | 135 | 258 | 359 | 530 | 100 | 0 |
| Summatran light Waxy | 158 | 234 | 401 | 494 | 663 | 94 | 6 |
| Alba Heavy | 253 | 307 | 449 | 550 | 688 | 93 | 7 |

Comparisons indicate that the algae crude matches best with the Sahara extra light oil.

A similar process of bio-oil formation can take place with other aliphatic biopolymers derived from plants. Moreover, the non-aliphatic biopolymers such as the carbohydrates, proteins, and lignin would undergo depolymerization and solubilization in the aqueous medium. Higher order plants have peridermal layers on their exterior surfaces that act as barriers to retain water as well as to resist microbial and fungal attacks. These layers contain lipids, polysaccharides, lignin and cuticular or suberinic biopolymers. The cuticular and suberinic biopolymers have been classified as cutin, cutan, studies indicate that these glycerol units constitute an important ester-linkage site for the long-chain acids and alcohols.

Although cutin, cutan and suberin have all been extensively characterized and structures have been proposed, detailed structural description of a suberan biopolymer that is analogous to cutan in its method of isolation has not been previously made. Another focus is on what is called suberan from bark, specifically the bark of the River Birch (*Betula* nigra). The bark of *Betula nigra* was chosen because of its availability and the fact that much has already been learned of the chemistry of birch bark.

The insoluble components of birch bark, including suberan, have been previously investigated by pyrolysis-gas chromatography mass spectrometry (py-GCMS). An insoluble, non-saponifiable polymethylenic biomacromolecule has been identified and named suberan (suber=cork (lat.); –an=derived from). This substance was separated from acidified saponification liquors of a previously lipid-extracted bark residue. When these liquors were extracted with dichloromethane (DCM), the white suberan residue formed an insoluble precipitate at the aqueous/DCM interface. Suberan showed a unique distribution of pyrolysis products leading the authors to believe this material was different than previously studied biopolymers such as suberin, cutin and cutan. Suberan was found to be comprised of a homologous series of n-alkanes, n-alk-1-enes, and $\alpha,\omega$-alkadienes with carbon lengths dominated by $C_{20}$ and $C_{22}$ while spanning from $C_6$-$C_{37}$. The analysis was limited to the destructive technique, py-GCMS, and no overall structure for suberan was proposed. Herein, the material envisioned as suberan is a residue obtained from saponification of suberin/suberan mixtures that has been treated to remove lipids, lignin, and carbohydrates. This definition of suberan matches that used to differentiate cutan from cutin, and is the primary method employed to isolate algaenan from algae.

Figure 3:
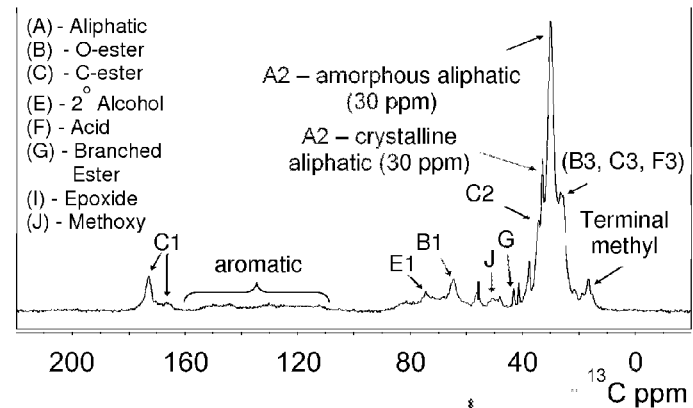
FIG. 3 is solid-state $^{13}C$ NMR spectra for a) a suberin/suberan mixture isolated from the bark of river birch, b) cutan isolated from *Agave Americana*, c) cutin isolated from tomato fruits, and d) algaenan isolated from *Scenedesmus* spp. Algae.
Figure 3:
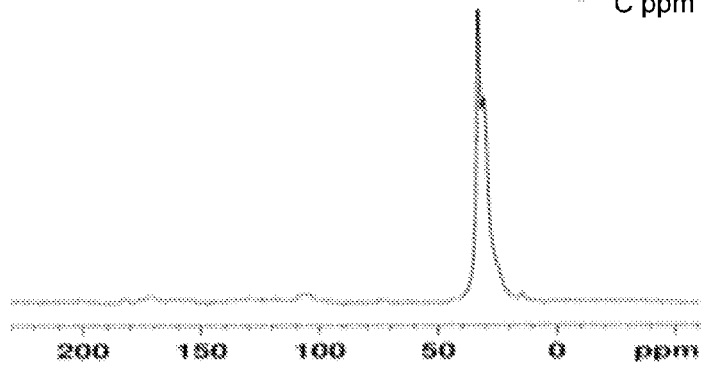
Figure 3:
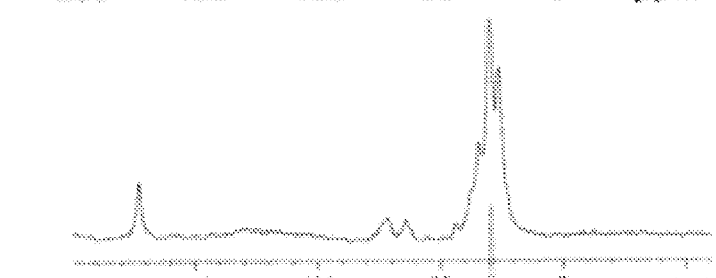
Figure 3:
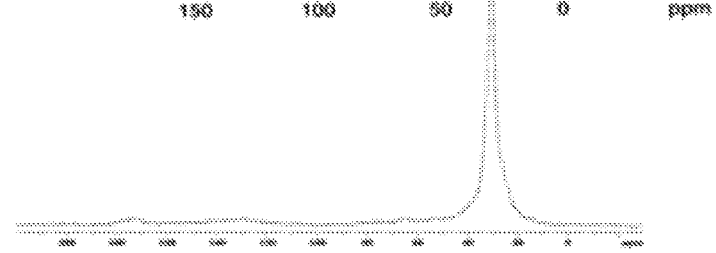

One important feature of the various aliphatic biopolymers is their high proportion of polymethylene units. These are depicted quite readily in solid-state $^{13}$C NMR spectra shown in FIG. 3, all of which show an intense peak in the polymethylene region (0-50 ppm) of the spectrum. The additional presence of carboxylic acid groups (probably ester functional groups at 175 ppm) is an indication that the polymethylene groups are held together in a polymeric state as esters, similar to what is observed for algaenan. The spectrum of algaenan is included in FIG. 3 to make this point. It is important to note that these aliphatic biopolymers are obtained as isolates from either whole leaf material or from whole bark. In some instances, they constitute only a fraction of the whole plant tissues, but in others they can contribute substantially.

Figure 4A:
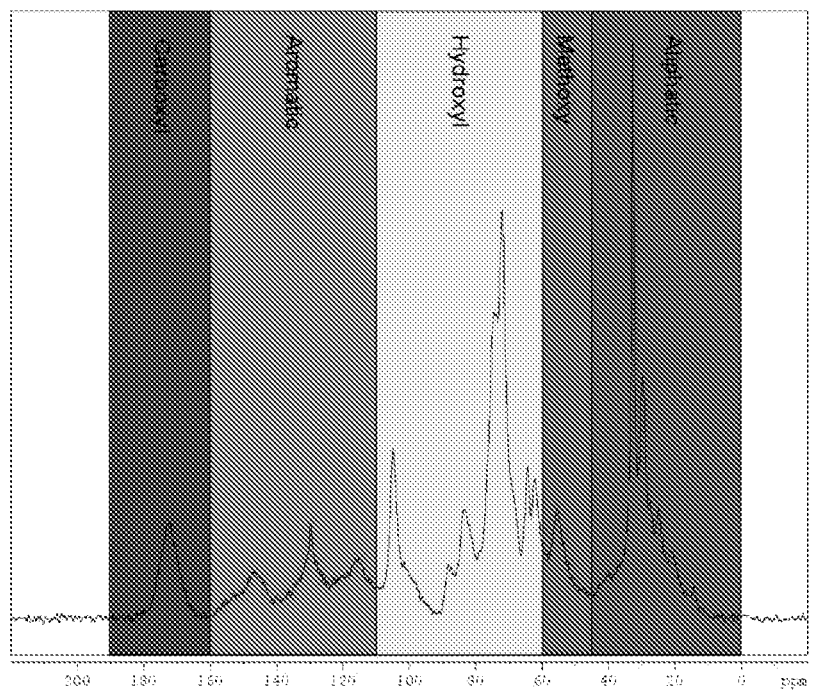
FIG. 4A is solid-state $^{13}C$ NMR spectra of the bark of river birch (*Betula nigris*)
Figure 4B:
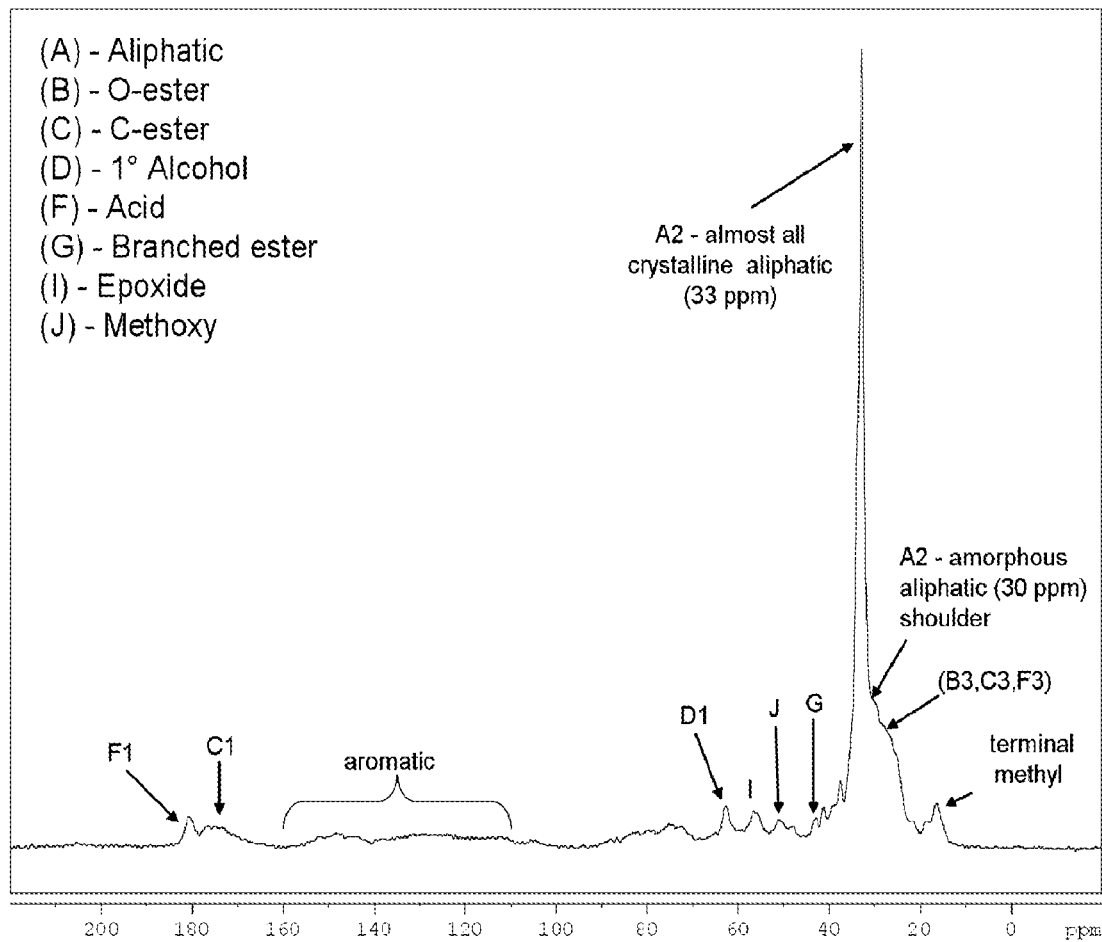
FIG. 4B is solid-state $^{13}C$ NMR spectra of the isolated suberan of the bark of river birch (*Betula nigris*)

FIGS. 4A and 4B show the spectra of the whole bark of river birch alongside that of the isolated suberan from the bark. One can readily observe that the sharp aliphatic signal that is so characteristic of the suberan only shows up as a relatively small but clearly distinguishable constituent of the whole bark. The other constituents are peaks that are attributed to carbohydrates and lignin, both of which comprise the major fraction of the bark biomass.

Figure 5:
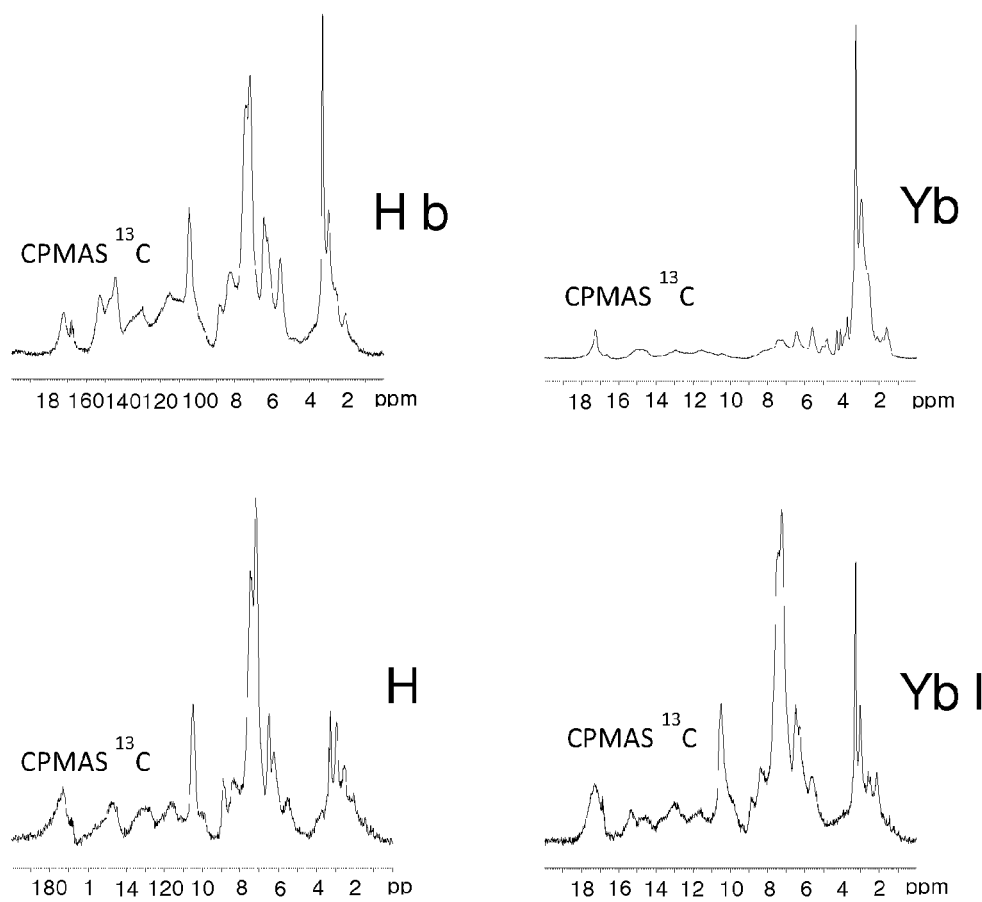
FIG. 5 is solid-state $^{13}C$ NMR spectra of hemlock bark (H b), hemlock leaves (H 1), yellow birch bark (Yb b) and yellow birch leaves (Yb 1)

On the other hand, some bark samples show a major presence of these aliphatic signals, as illustrated in FIG. 5. The bark from yellow birch (Yb b) is mostly composed of these types of signals and a peak at 175 ppm which indicates that these biopolymers are mainly esters similar to the long-chain polyesters which are thought to be observed in algaenan.

Figure 6:
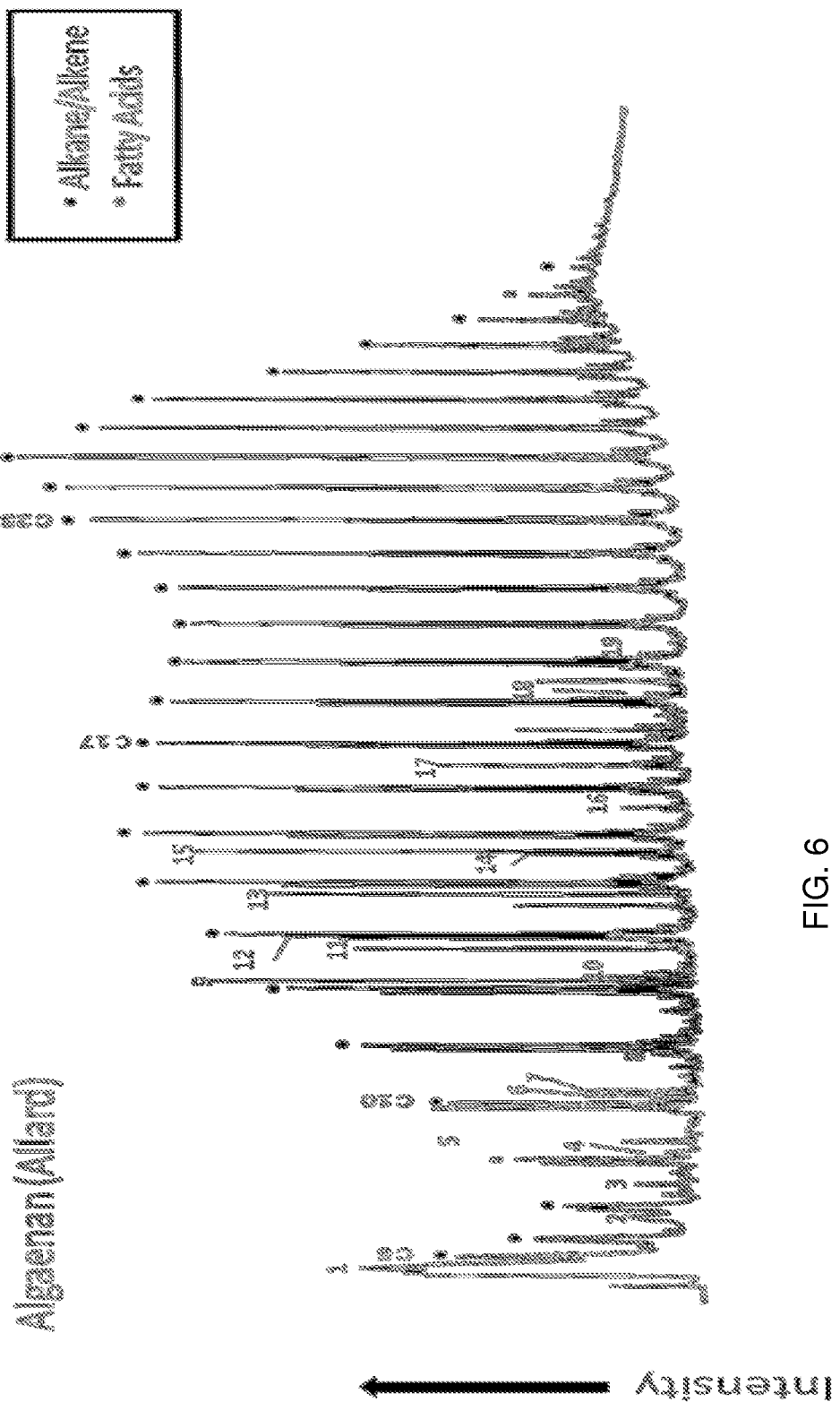
FIG. 6 is a graph of flash pyrolysis of algaenan from *Scenedesmus* spp. Algae.

Without being bound to any specific theory, it is believed that the polyester character of algaenan is mainly responsible for the production of hydrocarbons upon pyrolysis. This is evident from flash pyrolysis of algaenan in which a series of n-alkane and n-alkenes are the dominant products observed in FIG. 6. When such algaenan is subjected to hydrous pyrolysis as has recently been done in laboratory experiments, the resultant products are a series of n-alkanes that range from n-hexane to n-dotriacontane, as seen in FIG. 2. Even when one utilizes whole algae that contain proteins and carbohydrates as major components, these components simply dissolve in the aqueous system but the algaenan still produces oil that floats to the surface of the water. Similarly, with plant parts that contain the aliphatic biopolymers as either minor or major constituents of the plants, the carbohydrates, lignin, and other non-aliphatic materials will just dissolve. The aliphatic biopolymers whose structures resemble algaenan will be pyrolyzed and converted to hydrocarbons. The non-aliphatic materials dissolve in the aqueous phase can be removed from the residue for use as fertilizer or in other products.

Figure 7:
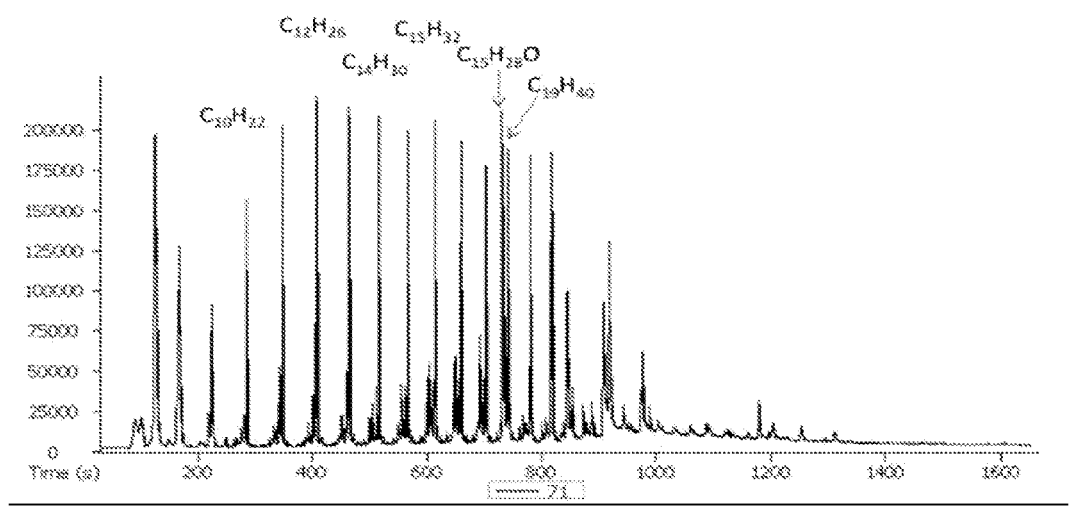
FIG. 7 is a graph of flash pyrolysis data showing the selected ion trace m/z 71 for the residue obtained from a subcritical aqueous treatment of river birch bark at 250° C.
Figure 8:
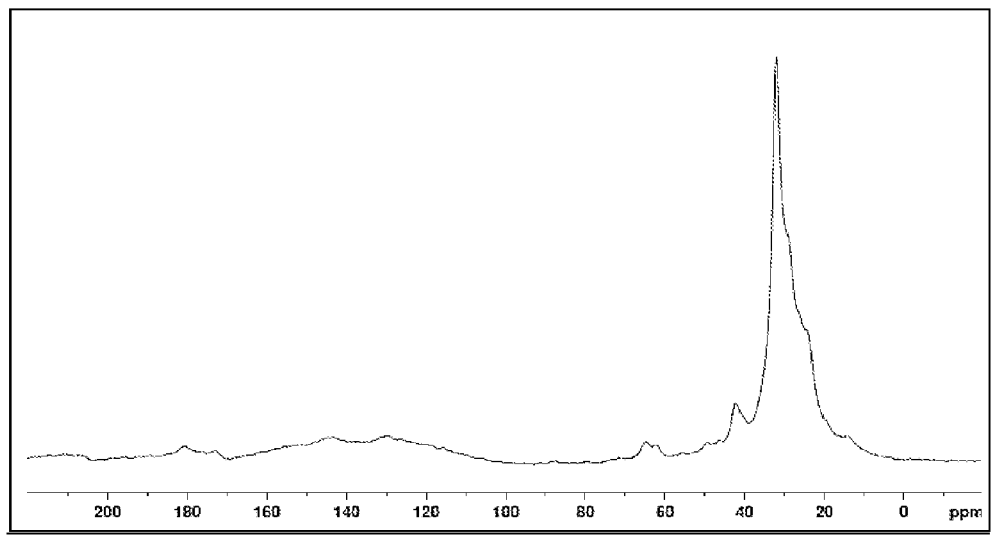
FIG. 8 is a solid-state $^{13}$C NMR spectrum of the residue obtained from subcritical water heating of the river birch bark at 250° C.

FIG. 7 shows a pyrolysis run for river birch bark that has been subjected to hydrous treatment at 250° C. to remove carbohydrates. The chromatogram is a select ion trace for m/z 71 which selects for n-alkanes. Clearly, the major peaks are n-alkanes ranging from $C_6$ to $C_{21}$ n-alkanes even though other peaks are observed for oxygenated species also produced in the pyrolysis. The solid-state $^{13}$C NMR data for this residue is shown in FIG. 8 where it can be seen that the spectrum obtained is very similar to that of suberan isolated chemically, shown in FIG. 4B. The subcritical water heating has removed carbohydrates and some lignin from the whole bark (spectrum shown in FIG. 4A) and has concentrated the suberin/suberan components that are highly aliphatic (peak at around 30 ppm).

Figure 9:
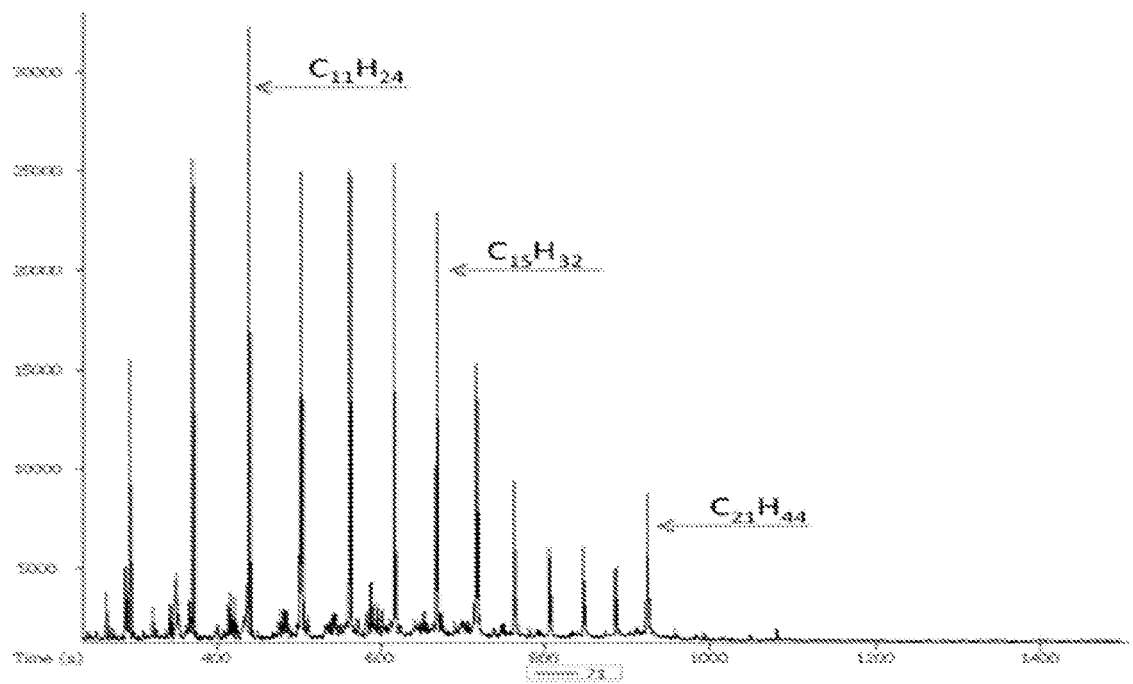
FIG. 9 is GC/MS select ion trace (m/z 71) for a hexane extract of the river birch bark heated in subcritical water at 360° C. for 72 hours.

The isolated residue from this subcritical water extraction step was further subjected to hydrous pyrolysis at 360° C. Most significantly, in heating at 360° C., hydrocarbons are formed and extracted into hexane solvent. The GC/MS select ion trace for m/z 71, which is selective for n-alkanes, shows the production of these compounds in FIG. 9. A homologous series of n-alkanes ranging from n-nonane to n-heneicosane is observed. Alkanes of octane or lower carbon number are not observed in this analysis because the solvent used for extraction is hexane and the GC/MS analysis is affected by elution of solvent during emergence of these species. The absence of n-alkanes of higher homology than heneicosane is an indication that it is the pyrolysis of docosanolide-like structures in the suberan (see FIG. 7) that lead to hydrocarbon production, most like via a decarboxylation process.

Aliphatic biopolymers from a variety of higher plant parts (leaves, bark, and perhaps roots) can yield hydrocarbons during pyrolysis. The disclosed one-step hydrous pyrolysis procedure that only involves the use of water as the reagent and solvent can be used to produce the hydrocarbons. An added benefit is that one can isolate the aliphatic biopolymers or simply the whole plant parts and subject them to conversion without the need to dry them prior to reaction.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A process for producing selective hydrocarbons from plants comprising:
   providing a feed material of plant biomass containing aliphatic polymers;
   subjecting the plant biomass to water at a subcritical temperature for a predetermined period of time in a reactor;
   collecting an aqueous liquid phase product from the reactor; and
   separating the hydrocarbons from the aqueous liquid phase product.

2. The process of claim 1, wherein hydrocarbon chain lengths of the separated hydrocarbons are between a range of $C_1$ and $C_{30}$ and the hydrocarbon chain lengths vary between the range as a function of a type of plant biomass provided.

3. The process of claim 1, wherein the aliphatic polymers are is one or more of suberin, suberan, cutin and cutan.

4. The process of claim 1, further comprising genetically modifying plant biomass prior to providing the plant biomass as the feed material.

5. A process for producing selective hydrocarbons from plants comprising:
   extracting aliphatic biopolymer from plant material;
   subjecting the aliphatic biopolymer to water at a subcritical temperature for a predetermined period of time in a reactor;
   collecting a liquid product containing hydrocarbons from the reactor; and
   separating the hydrocarbons from the liquid product.

6. The process of claim 5, wherein hydrocarbon chain lengths of the separated hydrocarbons are between a range of $C_1$ and $C_{30}$ and the hydrocarbon chain lengths vary between the range as a function of a type plant material from which the aliphatic biopolymer is extracted.

7. The process of claim 5, further comprising chemically modifying the aliphatic biopolymer to have selective precursors subsequent to extracting the aliphatic biopolymer.

8. A process for producing selective hydrocarbons from plants comprising:
   providing a feed material of plant biomass containing aliphatic polymers;
   subjecting the plant biomass to hydrous pyrolysis, wherein:
     the aliphatic biopolymers are cracked to form hydrocarbons; and
     a remainder of the plant biomass will depolymerize in an aqueous phase;
   collecting a liquid mixture resulting from the hydrous pyrolysis; and
   separating the hydrocarbon from the liquid mixture.

9. The process of claim 8, wherein the hydrous pyrolysis comprises subjecting the plant biomass containing aliphatic polymers to water at a subcritical temperature for a predetermined period of time in a reactor.

10. The process of claim 8, wherein a remainder of the liquid mixture after the hydrocarbon is separated comprises carbohydrates, lignin, and proteins.

11. The process of claim 8, wherein the aliphatic polymers are is one or more of suberin, suberan, cutin and cutan.

12. The process of claim 8, further comprising genetically modifying the plant biomass prior to providing the plant biomass as the feed material.

* * * * *